United States Patent [19]

Peters et al.

[11] Patent Number: 5,595,427
[45] Date of Patent: Jan. 21, 1997

[54] MODULAR COUNTERTOP

[75] Inventors: Chris R. Peters, Chico; James W. Henderson, Paradise, both of Calif.

[73] Assignee: Transfer Flow International, Inc., Chico, Calif.

[21] Appl. No.: 387,336

[22] Filed: Feb. 13, 1996

[51] Int. Cl.⁶ .................. A47B 57/00; F16B 2/02
[52] U.S. Cl. ............... 312/140.4; 108/64; 52/584.1; 403/405.1; 403/326; 403/401; 403/286; 312/140.3
[58] Field of Search ............. 312/140.3, 140.4, 312/107, 400, 408; 108/63, 64, 185, 166; 52/584.1, 489, 769, 285.1, 128.6, 285.3; 403/11, 12, 401, 326, 405.1; 156/304.1, 304.5

[56] References Cited

U.S. PATENT DOCUMENTS

| | | | |
|---|---|---|---|
| 1,226,419 | 5/1917 | Turner | 403/405.1 |
| 1,651,325 | 11/1927 | Bush | 403/401 |
| 1,822,217 | 9/1931 | Hudson et al. | 403/286 |
| 1,919,780 | 7/1933 | Fairbank | 52/548.1 |
| 2,038,638 | 4/1936 | Brey . | |
| 2,614,014 | 10/1952 | Stanitz | 108/27 |
| 2,895,778 | 7/1959 | Lieber | 108/27 |
| 2,970,872 | 2/1961 | Ullman, Jr. . | |
| 3,091,487 | 5/1963 | Gallagher et al. | 108/64 UX |
| 3,606,508 | 9/1971 | Burnes | 312/140.3 |
| 3,847,865 | 11/1974 | Duggins . | |
| 4,409,906 | 10/1983 | Alneng | 108/64 |
| 4,802,422 | 2/1989 | Beard | 108/64 |
| 5,018,628 | 5/1991 | Schenck et al. | 312/140.3 X |
| 5,253,932 | 10/1993 | Nesovic | 312/140.31 |
| 5,259,691 | 11/1993 | Moore et al. | 52/584.1 X |
| 5,330,262 | 7/1994 | Peters | 312/140.4 |
| 5,359,817 | 11/1994 | Fulton | 52/238.1 |
| 5,362,063 | 11/1994 | Cummings | 108/63 X |

Primary Examiner—Peter M. Cuomo
Assistant Examiner—Robert J. Sandy

[57] ABSTRACT

A modularly constructed countertop generally of plastic solid surfacing material and including connectable modular countertop panel sections including various lengths of straight sections, and corner sections having thickened finished front edges. Included is an error resistant arrangement of adhesively seaming one countertop panel section to another utilizing easily aligned edges having registration grooves for aligning the top surfaces of adjacent sections flush with each other during adhesive seaming. Included for clamping purposes during the adhesive seaming are rigid elongated strips each having transverse grooves located across a bottom surface. Top surfaces of the strips are glued to the bottom surface of the countertop panel sections adjacent and parallel the edges to be abutted and adhesively seamed. Linearly extendable and retractable springs with catches (rings) on the terminal ends thereof are placed within the transverse grooves spanning between two adjacent strips wherein the springs temporarily serve as continuous tension clamps against the seam while liquid adhesive within the seam cures.

4 Claims, 7 Drawing Sheets

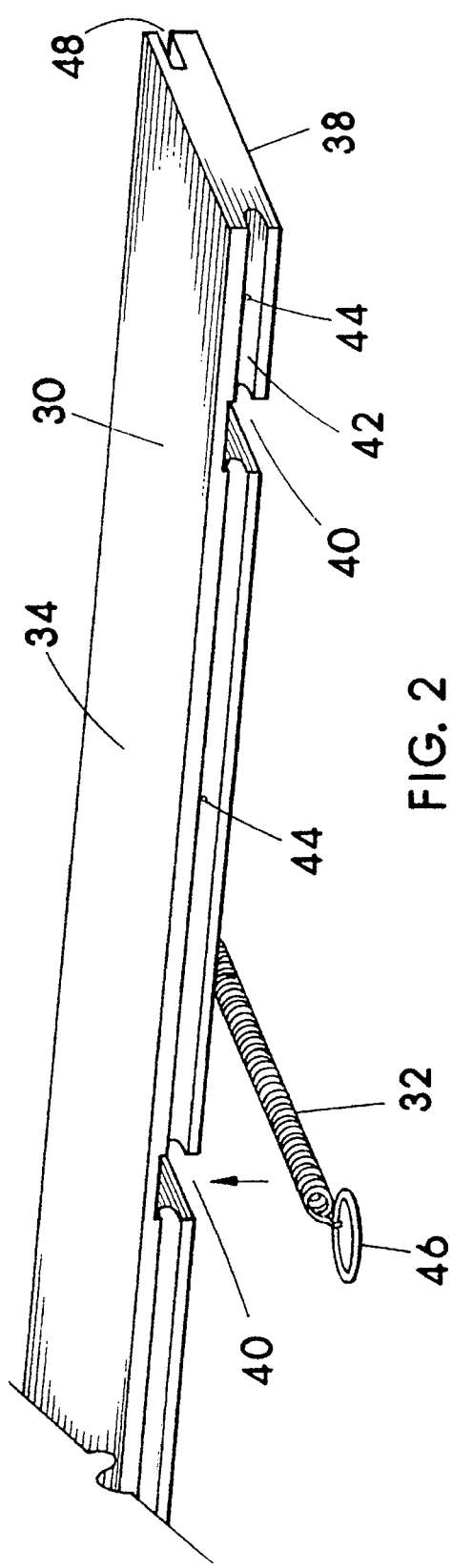
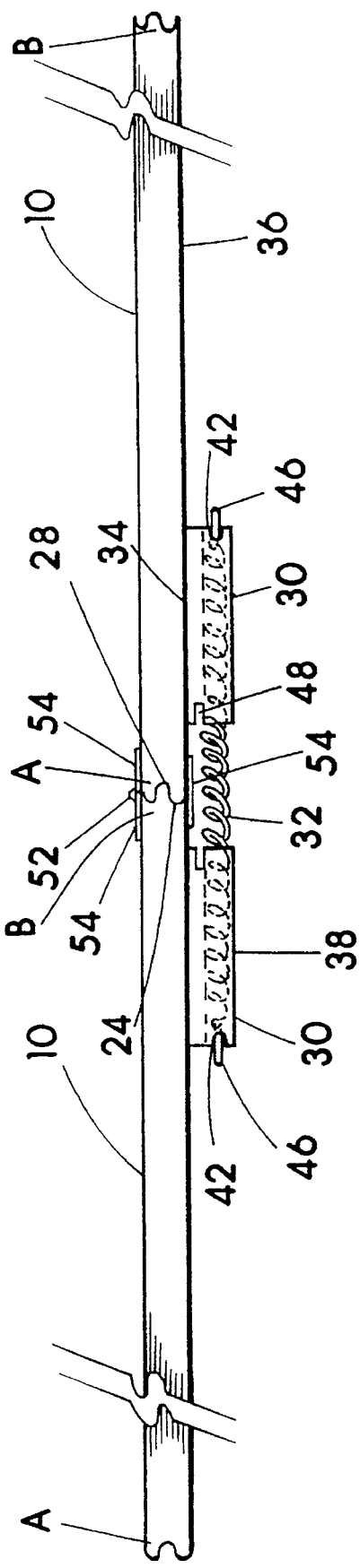
FIG. 2
FIG. 3

MODULAR COUNTERTOP

BACKGROUND OF THE INVENTION

1. Field of the Invention

This invention relates to countertops manufactured of solid surfacing material generally of thick non-laminated rigid plastics. More particularly this invention pertains to the defining of a countertop utilizing adhesively seamed modular panel sections of polymeric solid surfacing material.

2. Description of the Related Prior Art

Countertops made of solid thick plastics, that is, non-laminated plastic solid surfacing material have become quite popular in kitchens, bathrooms, and offices. The growing popularity of plastic solid surfacing materials to define countertops is due to the material having the qualities of high durability and ease of damage repair, ease of cleaning and sterilization, and beauty. Another widely appreciated aspect of plastic solid surface countertops is the appearance of a single and continuous countertop even when it is fabricated of many adhesively bonded sections.

Solid surfacing materials as referred to in this disclosure are non-foamed, non-laminated polymer based materials in relatively thick rigid sheet form useful for defining surfaces. Plastic solid surfacing materials are most often manufactured and sold in sheet form, typically in 30 inch wide × 12 foot lengths in thicknesses between ¼ through ¾ inches. Such polymer based solid surfacing materials are typically manufactured substantially of polyester or acrylic resins, or alloys thereof, depending upon the manufacturer and the particular formula being used, and most often contain various quantities of other components or additives both natural and synthetic to form desired color, visual patterns, and other desirable visual and physical characteristics.

Plastic solid surfacing materials are available from several U.S. manufacturers such as E. I. dupont de Nemours & Co., Inc. of Wilmington, Del. 19898 U.S.A., who market their polymer based solid surfacing materials under the trademark of "Corian". "Corian" is a trademark of Du Pont which refers to their solid surfacing polymer based material. "Corian" is a substantially rigid, non-foamed, non-laminated, non-coated solid material composed primarily of acrylic components, and containing smaller quantities of additives. "Corian" is most often made and sold in sheet form. U.S. Pat. No. 3,847,865 issued Nov. 12, 1974 to R. B. Duggins and assigned to E. I. duPont de Nemours & Co., teaches one formula for making plastic solid surfacing material of the general nature of that referred to in this disclosure.

Another manufacturer of polymer based solid surfacing material is the Nevamar Corporation located at 8339 Telegraph Rd., Odenton, Md. 21113 U.S.A. The Nevamar Corporation markets their solid surfacing material under the trademark of "Fountainhead". "Fountainhead" is a substantially rigid, non-foamed, non-laminated, non-coated solid material composed of a polymer alloy comprised mostly of polyester components having therein various percentages of acrylic components. "Fountainhead" is most often made and sold in sheet form.

Another manufacturer of polymer based solid surfacing material is the Formica Corporation, located at 155-T Rte. 46, W., CN-980, Wayne, N.J. 07470 U.S.A. The Formica Corporation sells their solid surfacing material under the trademark name of "Surell". "Surell" like "Corian" and "Fountainhead", is a dense solid plastic most often made and sold in sheet form. "Surell" is a substantially rigid, non-foamed, non-laminated, non-coated solid material composed substantially of polyester components.

Du Pont, the Nevamar Corporation, and the Formica Corporation, and several other companies not specifically herein mentioned, who produce very similar polymer based solid surfacing materials to one another, manufacture and sell polymer based solid surfacing materials in sheet form intended for use as vertical walling or horizontal countertops.

Some additional recognized advantages of using polymer based solid surfacing materials such as "Corian", "Fountainhead" or "Surell" over other available materials such as wood, metal, ceramic tile, and high pressure plastic laminates for countertops, exists in the fact that the material is a solid, polymeric non-laminated structure which the color or decorative color patterns extend deep or completely therethrough. If polymer based solid surfacing material does become stained, burned or scratched so deeply that the damage cannot be removed with a common household cleanser, the damage can be easily removed by light sanding with steel wool or fine sand paper, and this due to the fact that the material is solid, and the color or visual patterns extend generally completely therethrough. Furthermore, plastic solid surfacing materials typically have a high tensile strength, are hard, dense and rigid, and are resistant to chipping, splitting, warping, burning, and staining, all of which cannot be said about the many other materials which could and have been be used to define countertops. Another attractive quality associated with polymer based solid surfacing materials is the availability of properly colored adhesives for permanently gluing pieces of the material together. Additionally, the polymer based sheets can be cut to size or otherwise shaped with mechanical material removal methods and tools using sawing and shaping tools such as router bits, power saws and shapers and the like, similar to those used to cut and shape wood.

Polymer based solid surfacing materials such as "Corian", "Surell" or "Fountainhead" may be manufactured at a relatively low price to very closely resemble the texture and appearance of marble, granite, and other natural stone products which have long been desired and used as building materials due to recognition of the durability and beauty of such natural substances. It should be noted that not all plastic solid surfacing material is colored to simulate a stone product. Although plastic solid surfacing material is usually less expensive to purchase than natural stone for use as a countertop, plastic solid surfacing material is still, at least in the short term, relatively expensive compared to high pressure laminates commonly used for countertops. Due to the relative high material cost coupled with the current level of required skill in properly installing plastic solid surfacing material, mostly in the cutting and seaming thereof to achieve flat surfaces and strong imperceptible seams, and thus the desired single piece construction appearance, solid surfacing countertop material is normally not sold directly to the general public, but instead is sold to highly trained and usually factory certified professional installers who will properly cut and seam the material in the customers home or office. "Professional installer" or "professional" will henceforth generally refer to one who is highly skilled and practiced (experienced) in properly installing plastic solid surfacing material, and who installs such material usually on a daily basis as a profession.

Common prior art techniques employed by professional installers of plastic solid surface countertop include applying interlocking grooved or otherwise registerable side edges on the sides of two large panels of the material to be adhesively joined. These registerable edges are typically applied in the field utilizing a router and a readily available cutting bit which makes registerable or matable serrations. The registration of the edges is important for achieving matching levels on the adjacent top or upper surfaces of two large flat horizontal panels being joined. Proper registration of the top surfaces of two adjacent panels is critical in terms of reducing finishing sanding to a minimum and in achieving a substantially flat overall countertop surface. Additionally, it is very common for sheets of solid surfacing material to vary in thickness, up to 0.055 from one sheet to the next from the same manufacturer, even though they are of the same nominal thickness. This variation of sheet thickness results in the tops of two adjacent sections of different thickness being misaligned when the two sections are placed side-by-side resting atop a flat support surface, therefore interlocking registration structure is usually needed and applied when large flat sections or panels of plastic solid surfacing materials are adhered to one another to define a single large flat countertop section. The registration of the two adjacent side edges is applied to align the adjacent top surfaces, and this of course leaves the underside surfaces slightly misaligned or laying in different planes to the degree in which the two panels vary in thickness, which does not create any significant problems due to the small degree of typical thickness variations.

Another typical procedure utilized by professional installers is to apply clamping pressures to draw seams together during the joining process wherein the proper color of liquid adhesive which sets by catalytic action is used to permanently connect two pieces. Such clamping is of importance in consistently achieving both a strong and properly aligned joint, and a finished joint which will be imperceptible when completed. Typically, professional installers either use commercially available set-screw clamps, or spring biased squeeze clamps commonly called "pony clamps" to apply clamping pressures to joints during the adhering process. The set-screw type clamps are typically of the long bar type capable of spanning across two wide or long panels being joined. The professional installer, being a highly skilled craftsman in his art knows from experience the proper initial clamping pressure to apply to the joint being glued. With set-screw clamps, the professional can set the proper initial clamping pressure utilizing feel and by visually watching the adhesive flow upward out of the joint. He also knows that with the use of set-screw clamps, that as the quick-setting adhesive flows out of the joint, with the passage of several minutes and prior to the adhesive fully curing, that he must repeatedly re-tighten the set-screw clamps the proper amount in order to again properly close the joint and to compensate for the adhesive having moved out of the joint during the hardening process after the initial setting of the clamping pressure. Due to this re-tightening requirement with the use of set-screw type clamps, professional installers often prefer to use spring clamps (pony clamps) whenever possible, since the spring clamps have the distinct advantage of continuously working utilizing their inherent spring loading to close the joint as the adhesive flows during the hardening process. Thus, once a spring biased clamp is properly set to close a joint in the process of being glued, the spring clamp need not be again adjusted since it is self adjusting by the nature of the loaded spring, but remains in place until the adhesive has hardened.

The spring clamps typically only open at the jaw about 3 to 4 inches, being pivotally hinged between the handle end and the openable jaw end, and thus, professional installers utilizing spring clamps temporarily affix blocks of plastics or other materials using hot melt glue on the top surface on each side of the joint, and then apply the spring clamps spanning across the temporary blocks to draw the joint together. After the adhesive in the joint has fully set, the blocks applied for the spring clamp must then be removed. With spring clamps, the professional installer knows from experience the approximate strength of the spring clamping pressures, he knows how many clamps to use and where to place the clamps, and he also knows where to attach the temporary blocks, since placing the blocks nearer or farther from the joint and one another will effect the clamping pressure applied to the joint when using spring clamps. The clamping pressures are relatively critical, in that insufficient pressure can lead to a weak joint and unsightly voids and gaps in the finished joint, and too much clamping pressure squeezes an excessive amount of the liquid adhesive out of the joint to leave insufficient adhesive to render an adequately strong joint, leading to "dry joint failure" as it is referred to in the industry.

Other prior art which is known to us and believed somewhat pertinent to the present invention is in U.S. Pat. No. 5,253,932 issued Oct. 19, 1993 to D. N. Nesovic for "Modular Countertop System"; and also in U.S. Pat. No. 5,018,628 issued May 28, 1991 to R. Schenck et al for "Working Surface". The Nesovic patent teaches a modular countertop system which may utilize plastic solid surfacing material, and utilizes numerous smaller pieces to define a finished larger countertop. Nesovic indicates pins or dowels inserted into holes may be used for alignment and registration purposes, and for these reasons the Nesovic disclosure is relevant to the present invention, although it does not teach or anticipate the present invention. The Schenck et al disclosure is believed relevant because it teaches a modular countertop defined by components which may be releasibly joined utilizing a tongue and groove interlocking arrangement which also gives registration. The Schenck et al disclosure however does not teach or anticipate the present invention.

Other prior art related to countertops of which we are aware is shown in U.S. Pat. Nos. 3,606,508; 2,895,778; 2,038,638; 2,970,872; and 2,614,014. These patents teach countertop construction in various manners and are therefore related to the present invention, although they do not teach or suggest the present invention or solve the problems solved by the present invention.

It is believed that the providing of an error resistant arrangement wherein a non-professional having little or no experience in this particular field could easily join sections of plastic solid surfacing material together to define a countertop would be a significant improvement in the art, and would be to the benefit of both the general public and to manufacturers of plastic solid surfacing materials. Such a feasible modular countertop using plastic solid surfacing material would be inherently simple and error resistant to install so as to allow the "amateur" (not a factory trained or highly experienced professional) to properly install his own countertop and save a substantial amount of money on hired labor. Such a modular countertop would necessarily incorporate methods and structures to help insure that any connected seams defined by the amateur installer would be strong and virtually imperceptible when completed, since one of the widely appreciated and sought after aspects of plastic solid surface countertops is the appearance of a single and continuous countertop even when it is actually fabricated of many adhesively bonded sections. Such a feasible modular countertop arrangement would need to provide both error resistant panel registration and clamping to allow the inexperienced installer to permanently seam components of the modular countertop together, and hopefully with the end results appearing quite professional. Additionally, such a modular countertop would require not only minimal skills of the inexperienced installer, but ideally would require few specialty tools, with this being to further hold the cost of installation to a minimum.

SUMMARY OF THE INVENTION

The herein detailed description of our invention is of preferred structures and best modes for carrying out the invention given for example, and it should be understood that changes may be made to that which is detailed and shown in the included drawings which fall within the scope of the present invention, but for the sake of briefness of this disclosure, all of these changes will not be described. The present invention is a modular countertop primarily of plastic solid surfacing material, and is structured to render the proper installation of the countertop sufficiently simple that the non-professional or inexperienced "amateur" installer can relatively quickly install his own countertop, such as in his kitchen, with minimal skills and few specialty tools, at significant financial savings, and with the resulting finished countertop appearing flat and generally seamless, as though it were professionally installed. The invention encompasses an error resistant arrangement of defining a finished countertop utilizing several or many smaller modular components which may be selected for a particular countertop layout and then permanently connected to one another at the job site. The invention includes modular countertop components or sections, including various wide panel sections placed horizontally in use for defining work space surfaces. The countertop panel sections are available in commonly used lengths of straight rectangular countertop sections, and corner sections of both 90 and 45 degrees which may be connected to one another for defining L-shaped, U-shaped or simply straight countertops. The straight panel sections and corner panel sections include a thickened finished front edge extending downward for obscuring the crack or joint between the front underside edge of the countertop and the underneath supporting cabinet structure, and for giving the countertop a thicker appearance.

The thickened front edge is defined in a factory setting as is as much of the present modular countertop as is reasonably possible so as to reduce the amount of labor, time, skill and tools required by the amateur installer, and so from one view point, the present countertop might be considered to be in "kit" form, wherein members of the general public are or will be able to select and purchase the various components thereof from retailers such as building supply and home improvement outlets to meet their particular countertop installation needs, whether it is a U-shaped, L-shaped or straight countertop.

The invention includes several error resistant arrangements for permanently adhesively seaming together the panel sections of the modular countertop. A first seaming arrangement is herein referred to as a "factory prepared seam" for reasons to be explained. To allow for the factory prepared seam, all of the countertop panel sections include factory applied registration grooves on the thin lateral side edges, for the purpose of proper registration of two abutted side edges to be seamed in the field by the installer. The lateral side edges of the thickened front edge also preferably include registration grooves. The modular countertop panel sections, whether straight lengths or corner sections, are manufactured in the factory having the registration structure on the side edges, which when employed in the field helps align the top surfaces of adjacent sections flush with each other during the seaming process so as to reduce to a minimum the amount of finish sanding required, and additionally to help insure a flat countertop surface, and a strong and virtually imperceptible finished seam. As previously stated, proper registration of the top surfaces of two adjacent modular panel sections is critical in terms of reducing finish sanding to a minimum, and this is important not only in terms of reducing labor, but it has been found that the more finish sanding required at a seam by an inexperienced installer, the higher the likelihood of the top of the countertop being uneven when finished. Therefore, the present invention preferably includes factory applied registerable side edges on the modular countertop panel sections in order to eliminate the installer from having to apply the registration structures.

The present invention also includes use of a second error resistant seaming arrangement for creating registered custom seams by the installer in the event the factory lengths of modular countertop panel sections are not suitable for the particular countertop layout. On occasion, the installer will need to cut one of the factory provided straight lengths to a shorter length in order to accommodate the particular installation requirements. Since the two oppositely disposed lateral side edges of each standard factory panel length include registration grooves, and further, that different sheets vary in thickness slightly from the original manufacturer of the bulk sheet material, with the present invention, the shortening of one of these factory lengths involves the cutting-out, using a square cut for a butt joint to be later applied, of a center portion of a single modular panel section, and then the seaming of the sections back together, absent the center transverse cut-out, to define a shorter single panel, which is defined by two pieces of the same thickness since they are of the same initial sheet. For this panel shortening wherein a field created or "custom" seam is applied absent use of the factory applied registration grooves, the present invention provides structural components to insure a properly registered alignment of the top surfaces to reduce the amount of finished sanding required and to help insure a flat countertop and a strong and virtually imperceptible finished seam.

The invention also provides inexpensive and error resistant clamping arrangements for holding seams together during the adhesive bonding process. One such arrangement includes the use of rigid elongated rectangular strips, designated spring receiving strips, each having multiple transverse grooves located across what is considered to be the bottom surface. The top surface of the spring receiving strips are glued or otherwise affixed to the bottom surface of the countertop panel sections preferably by the installer on the job site, adjacent and parallel to the edges to be abutted and adhesively joined. Linear extendable and retractable tension springs with large catch rings on the terminal ends thereof are stretched linearly and temporarily placed within the transverse grooves and spanning across two adjacent spring receiving strips to serve as continuous tension clamps against the joint, drawing the panels toward one another while liquid adhesive placed within the joint cures. The use of the spring receiving strips and tension springs maintains proper tension against the abutted joint while the adhesive is liquid, drawing the abutted panels toward one another by continuously applying the proper closing pressure to further insure against voids, and thus to help insure a strong and properly closed seam which after finishing with abrasives is strong and virtually imperceptible. The use of the spring receiving strips and the tension springs serve several purposes, with a first being an inexpensive clamping arrangement which eliminates the need for the installer to acquire many and more expensive commercially available spring clamps or set screw style clamps widely used in the prior art, and secondly, to provide an arrangement wherein proper clamping pressures applied to the joint are in effect guaranteed. With the provided spring receiving strips and the tension springs, the tension springs are of a known strength and size (length), the receiving strips are of a known width, and therefore as part of the "kit" the installer purchases the receiving strips and tension springs, and glues the strips at about the proper distance from the registered edges of the two adjacent countertop panel sections as specified in the "kit" instructions, then when he installs the tension springs utilizing the catches as handles, the proper drawing strength between the two countertop sections will be automatically applied. If, for example the amateur installer were left to his own devices for clamping utilizing either adjustable set-screw clamps or non-adjustable spring clamps for example, he could apply insufficient or excessive pressure. The tension springs have been found to be quite forgiving of erroneous placement of the strips, and to still serve properly even when the spring receiving strips are glued an improper distance up to several inches out of place from the side edge of the panel section. When the adhesive is cured in a given joint, the spring receiving strips may be left in place permanently, but the tension springs are removed to be reused at the next joint. Therefore the present invention provides the installer with economical virtually guaranteed proper clamping pressures when adhesively seaming two panel sections of the modular countertop, with the clamping arrangement being of a type which automatically compensates for the viscous glue having squeezed or moved out of the joint prior to hardening.

A trim molding, which is preferably invertible to allow it to be used as a right hand or left hand end, having a particularly shaped grooved back surface cooperative with retaining spring clips is provided for finishing or trimming any exposed lateral side terminal edge of the countertop. The retaining spring clips are fastenable with screws to a strip member, which is preferably a spring receiving strip affixed underneath at the terminal edge of the countertop, and the back-side groove of the trim molding snaps-over the spring clips so that the trim molding is drawn inward and held against the side edge of the countertop while liquid adhesive between the two members is curing. Similar to the tension springs associated with the affixing of abutted edges of the countertop sections, the spring clips associated with the edge trim molding also apply predictable continuous clamping or drawing pressure while the adhesive hardens, continually closing the joint when the glue initially flows out of the joint, and working in conjunction with the groove of the trim molding, to help insure a tightly closed and virtually imperceptible seam when finished. The trim molding and associated spring clips are structured and arranged so that a single trim molding may be inverted and used on either a left hand or right hand terminal edge of the countertop, and this helps maintain a reasonably low number of component parts to be manufactured, stocked and selected.

The present invention not only allows a non-professional to easily properly install his or her own kitchen or like countertop, but in many situations also provides for an easier and quicker installation for the professional installer to complete.

These, as well as other objects and advantages of the invention will become more apparent with continued reading and with a review of the attached drawings.

BRIEF DESCRIPTION OF THE DRAWINGS

FIG. 2 is a partial perspective view of the end of one spring receiving strip with a tension spring positioned for insertion into a transverse groove of the strip. The tension spring is shown having a ring on the end which is wider than the transverse groove and larger than the diameter of the spring, and which serves as a catch when placed in the lengthwise groove of the strip.

FIG. 3 is a front edge view of two sections of countertop affixed together at a seam having registration grooves and using two of the spring receiving strips, one on each side of the seam, and tension springs within the aligned transverse grooves of the strips. A strip of adhesive tape is illustrated spanning across the seam and extending lengthwise underneath the seam to dam and prevent the viscous adhesive, which is initially a viscous liquid, from pouring out the bottom of the joint. The thickened front edge of the countertop has been removed from this illustration for clarity of that which is shown.

BEST MODES FOR CARRYING OUT THE INVENTION

Figure 1:
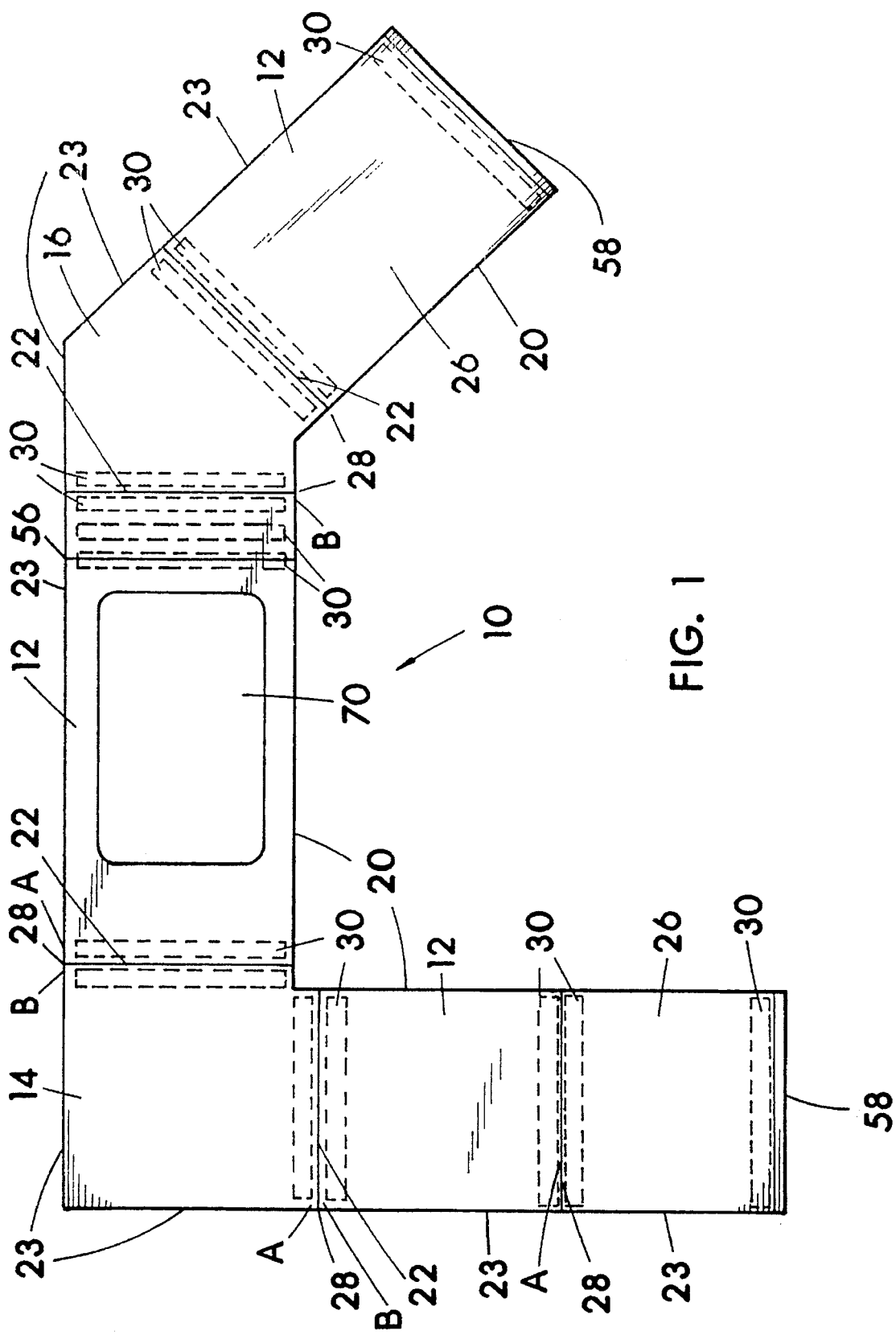
FIG. 1 is a top plan view of an example of a assembled countertop in accordance with the present invention showing different modular countertop panel sections affixed to one another, with the portions in dotted outline representing the spring receiving strips positioned adjacent and parallel each seam between the panel sections and underneath the countertop. A cut-out for a sink is illustrated in the center straight countertop section.

Now with reference to the drawings, the present invention includes modular countertop panel sections, including various commonly used lengths of straight rectangular panel sections 12, and corner panel sections of 90 degrees indicated at 14, and 45 degrees indicated at 16, which may selected for the specific installation requirements, and be adhesively permanently seamed together to define a countertop which is flat and includes imperceptible or virtually imperceptible seams and thus appears as a single piece countertop structure.

Straight panel sections 12 and corner panel sections 14, 16, which are the components which primarily define the top work space surface of the countertop will henceforth often jointly be referred to in this disclosure as panel sections 10 for the sake of briefness.

Panel sections 10 all include a thickened finished front edge 20 and side edge registration grooves 24 applied in a factory setting since they will be needed in most all countertops. Panel sections 10 as well as front edge 20 are all substantially comprised of plastic solid surfacing material such as that sold under the tradename of "Corian" for example, although we have considered possibly making thickened front edge 20 in some embodiments out of metal or hardwood to render a different decorative effect some might find appealing.

Figure 5:
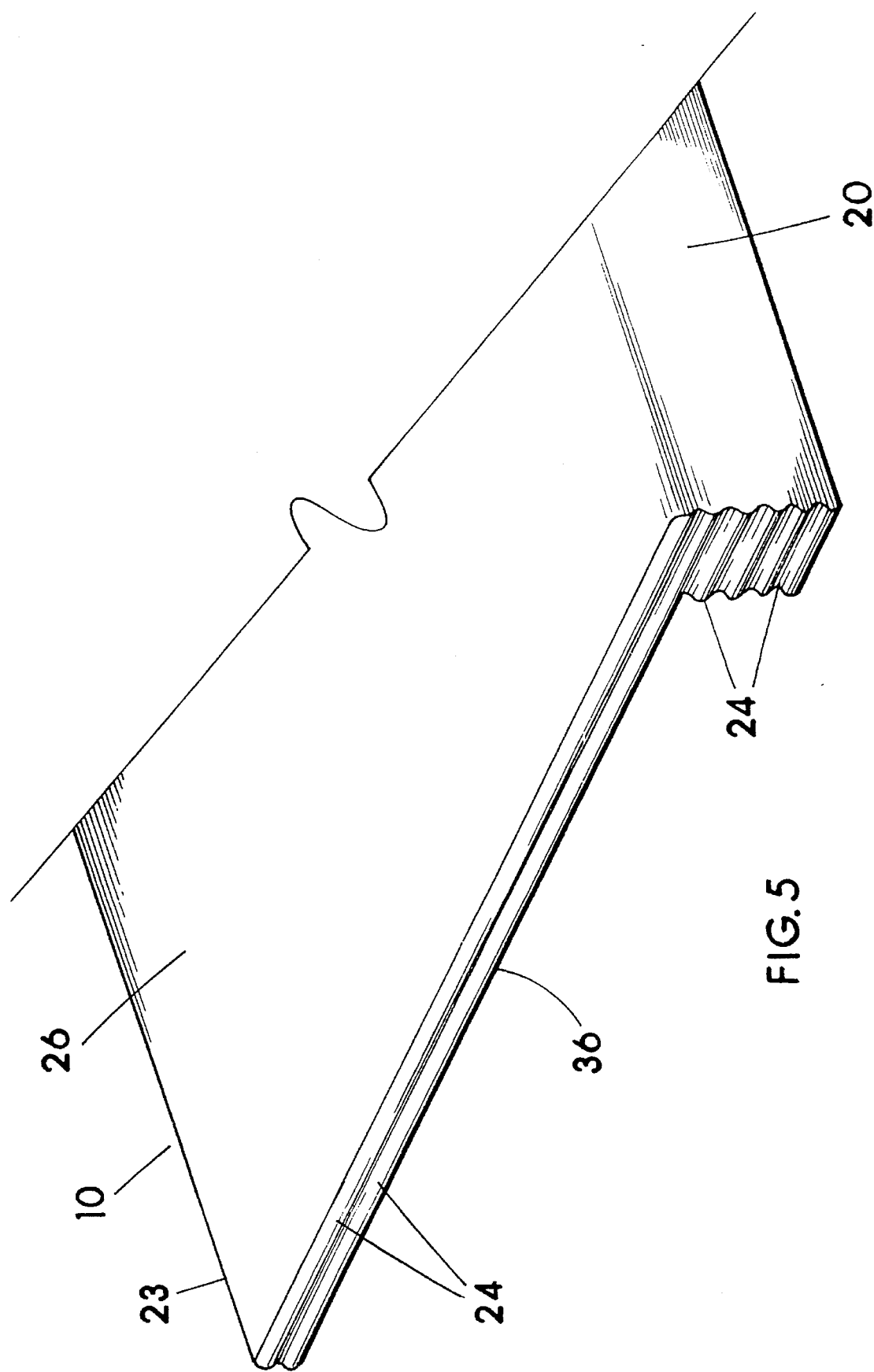
FIG. 5 is a view of one lateral side edge of a countertop panel section showing the registration grooves on the lateral side edge of both the countertop section and the thickened front edge.

Straight panel sections 12 may be made available in lengths of eighteen inches, two feet, four feet and upward in two foot increments up to ten or twelve feet, although we do not wish to be restricted to these lengths given for example only. As may be seen in the drawings, each panel section 10 is a thin flat sheet having a flat work space top surface 26 and an oppositely disposed flat bottom surface 36, although the top surfaces 26 could have upward extending field or possibly factory applied backsplashes or grooves cut therein along back edge 23 in preparation for the application of a backsplash, however we currently have no plans to apply backsplashes or grooves for backsplashes, as it is planned that butt joint glued-in-place backsplashes will be applied in the field when desired. Thickened front edge 20 is for obscuring the crack or joint between the front edge of the countertop and the underneath supporting cabinet structure (not shown because it is so well known), and to this end the thickened front edge 20 extends down to slightly below the flat plane of bottom surface 36 best shown in FIG. 5, the front edge 20 extends slightly beyond the front face of the cabinet in use. Each panel section 10 includes back edge 23 and front edge 20 across the width of the panel from back edge 23. Back edge 23 is in most countertop arrangements placed against a wall, although in using the present countertop such as in island or bar countertops, back edge 23 could also include a thickened edge for all practical purposes being the same a thickened front edge 20. Each panel section 10 includes two terminal lateral side edges 22 spanning between back edge 23 and front edge 20, with the lateral side edges 22 having horizontally disposed registration grooves 24 applied at the factory using cutting tools and machinery. The registration grooves 24 are applied in a manner and position so that the top surfaces 26 of two closely adjacent (abutted) panel sections 10 will be aligned flush to be in a like plane when the grooves 24 are properly mated, regardless as to whether the panel sections 10 are of the same thickness. If the panel sections 10 are not of the same thickness, the differences in thickness in the two mated panel sections 10 is shown in a very slight step between the two panels 10 on the bottom surfaces 36 only, and not on the top surface 26 due to registration grooves 24. The registration grooves on any given panel section 10 include an A and a B component. Each panel section 10 has an A component on one lateral side edge 22, and a B component on the oppositely disposed lateral side 22. When viewed from the front, each panel section 10 will have a component A on the left hand side edge 22 and a component B on the right hand side edge 22, and this allows the mating of an A with a B component with thickened front edge 20 of the two adjacent panel sections aligned and properly positioned. Registration grooves 24 being effectively tongue and groove or serrated interconnects are arranged so that the A component is matable with the B component wherein with mating of the two components A and B of two adjacent panel sections 10, the top surfaces 26 of the two adjacent panel sections 10 will be in the same plane, or flat and aligned with one another, although it should be realized the two panels sections 10 must be adequately supported in a substantially flat and like plane, and registration grooves simply aid in placing the top surfaces 26 in a like plane. Registration grooves 24 are cut into side edges 22 in the factory using careful depth setting and guiding of the cutting bits to help ensure the alignment of top surfaces 26 when two adjacent panel sections 10 are abutted to be adhesively seamed. The mating of an A component of one panel section 10 with the B component of a second adjacent panel section 10 is designated a factory prepared seam 28 since the registration grooves 24 are applied in the factory and utilized for registration in the seaming, and in FIG. 1 each of the factory prepared seams 28 indicates the mating of an A component with a B component of the registration arrangement.

In FIG. 1, a panel section 12 is shown having a sink cut-out 70, with the sink cut-out possibly being provided as a selectable option to one of the factory made panels in accordance with the present invention, or simply being a straight panel 12 which the installer is required to cut-out the hole for the sink where and when desired.

Corner panel sections 14 and 16 are also essentially flat on both the top 26 and bottom 36 surfaces, include back edge 23 and thickened front edge 20, and two lateral side edges 22, but as may be ascertained from FIG. 1, the lateral side edges 22 in the case of corner 14 are perpendicular to one another, and in the case of corner 16 are at 45 degrees to one another. Back edge 23 of corner 14 is of two sections 90 degrees to one another, as is the short front corner thereof, and back edge 23 of corner 16 is of two sections 45 degrees to one another, as is the short front corner thereof as may best ascertained from FIG. 1.

The widths from back edge 23 to the forward most edge of front edge 20 of straight panel section 12 will in most cases be provided in industry standard widths applicable to normal lower cabinet depths, which in the narrowest cabinets is about nineteen inches, and in the widest normal widths up to about twenty seven inches. Most kitchen lower cabinets are twenty-four inches deep, and for these cabinets, the width of straight panel sections 12 will be about twenty-five and a quarter inches overall, and having a flat surface on bottom 36 of at least twenty-four inches to rest on a cabinet, between back edge 23 and the nearest underside edge of thickened front edge 20 so that in essence all of thickened front edge 20 is positioned just slightly outward beyond the front surface of the cabinet face frame. Corner panels 14, 16 are made in widths compatible with straight panels 12 which are made in widths compatible with conventional lower cabinet depths.

The thickness between top surface 26 and bottom surface 36 of panel sections 10 may be ½ to ¾ inches nominal, and we plan to manufacture the panels 10 about ½ inches thick, although we initially considered utilizing ¼ thick plastic solid surfacing material adhered to a strengthening wood substrate.

As previously stated, thickened finished front edge 20 is defined in a factory setting for accurate and inexpensive manufacturing thereof, as it is believed that in most if not all use applications, the installer will desire a thickened finished front edge, and so it is applied in the factory. Front edge 20 generally comprises a strip or strips of plastic solid surfacing material adhered to the bottom surface 36, and finished with abrasives and polishes to appear as an integral part of the panel 10. The two opposite lateral side edges of thickened front edge 20 also include registration grooves 24 shown best in FIG. 5 so that registration during adhesive seaming is provided from back edge 23 through front edge 20. Shown best in FIG. 9, thickened front edge 20 is finished to include a roundover or radiused edge 61 at both the upper and lower forward most corner edges thereof, as this provides beth a finish which is not sharp to the touch, and is cooperative with the matching radii 61 of the invertible trim molding 58 to be later detailed.

Panel sections 10 are joined or joinable at the job site by adhesively seaming two panels sections 10 together at two lateral side edges 22, one side edge of each panel effectively abutted against the other, although a viscous adhesive is placed between the side edges 22. The seaming process whether registration grooves 24 are used as in factory prepared seam 28, or whether a custom seam 56 is applied for shortening a panel section includes use of linear extendable and retractable springs designated tension springs 32, and material strips or spring receiving strips 30. Tension springs 32 are made of coiled spring metal, and are in effect common tension springs. The springs 32 have two oppositely disposed terminal ends to which is affixed an end fitting, which in the example shown is a ring 46, one ring 46 to each end of a spring 32. The rings 46 serve as catches to allow the spring 32 to be stretched and held stretched across a seam, which will be explained later, and further, the rings 46 are of an adequate size to serve as handles, allowing the installer to easily grasp the rings in his fingers during the process of connecting and disconnecting the springs. The rings 46 are larger than the diameter of the body of springs 32, the reason for this to be explained later. We have considered using linear extendable and retractable springs made of a polymeric elastomer or rubbery material as opposed to the metal tension springs 32, although springs 32 of metal are quite inexpensive and function very well. Springs 32 are about four inches long in a relaxed state, and stretch to about nine inches, although this is for example only and we do not wish to be restricted to these sizes since we have found the springs 32 may be made in many lengths and strengths and to still function well within the scope of the invention.

Figure 4:
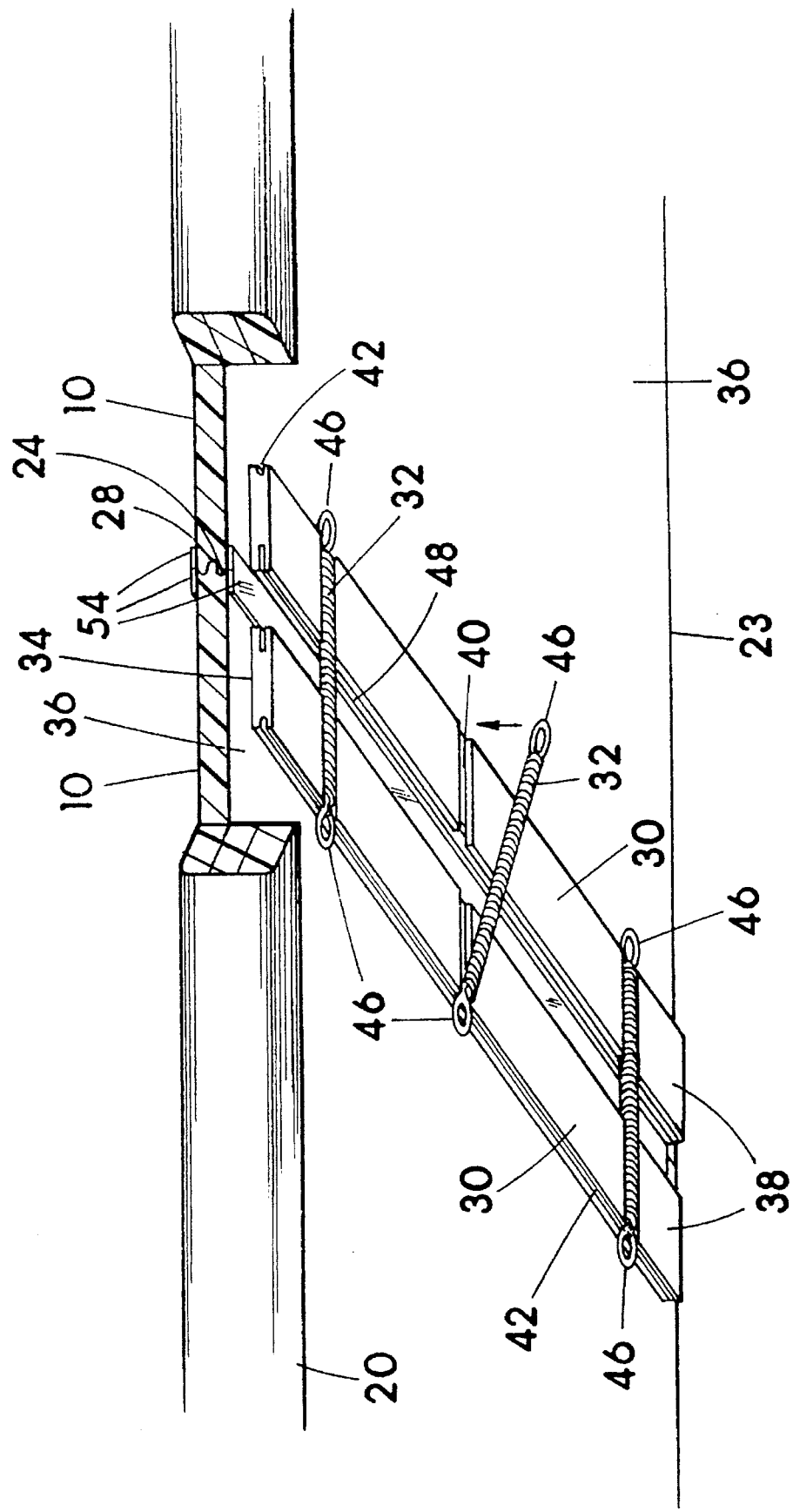
FIG. 4 is a bottom perspective view of a portion of countertop comprising two panel sections showing two spring receiving strips affixed one on either side of a seam and parallel to the seam, and the tension springs positioned within the transverse grooves of the spring receiving strips. The seam is one which utilizes two abutted lateral side edges of the countertop sections which include registration grooves. A portion of the overhanging thickened front edge is shown cut away for better viewing of the seaming arrangement.
Figure 6:
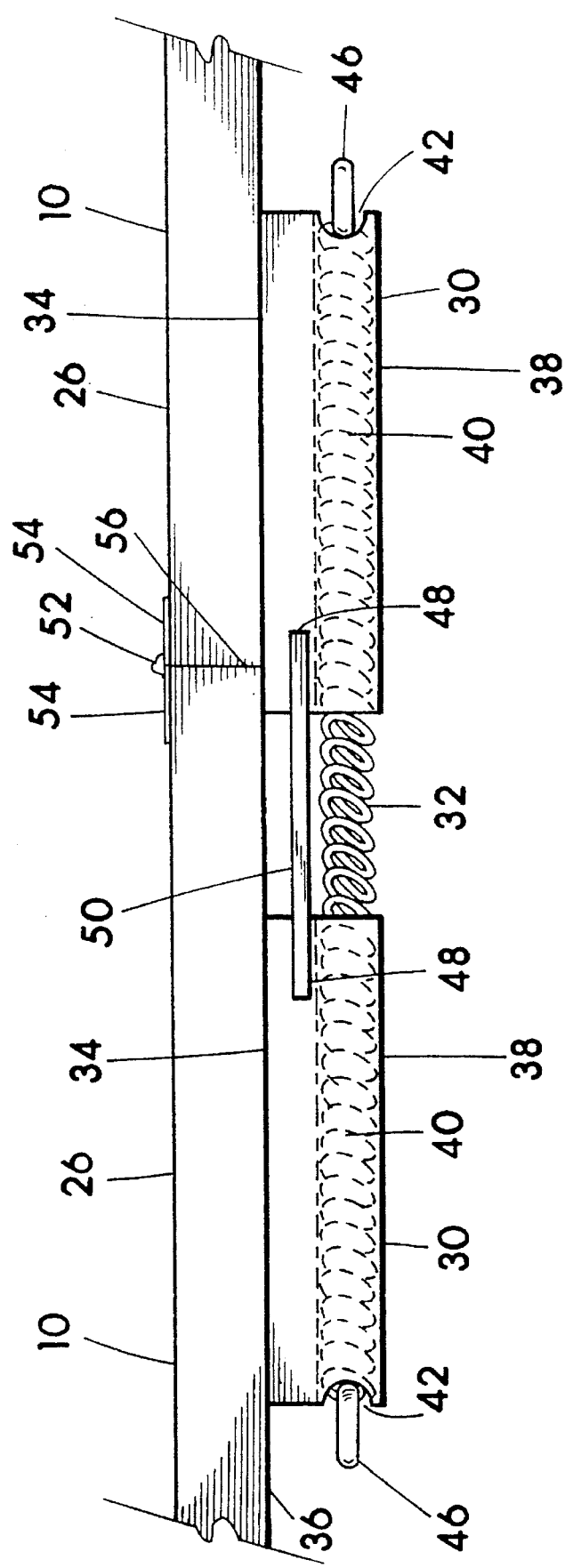
FIG. 6 is a front view of two panels affixed together with a straight or butt joint seam of the "custom" seaming arrangement previously mentioned showing the preferred placement of the spring receiving strips for this type of seaming. A metal plate, useful for assisting in registering the juxtaposed sections of countertop is shown inserted into lateral inside grooves of the spring receiving strips. The shown seaming arrangement is one which is used when a straight panel sectioned has been shortened by the cutting-out of a section, and thus the shown panels being seamed were originally of the same countertop panel section and thus of the same thickness.
Figure 9:
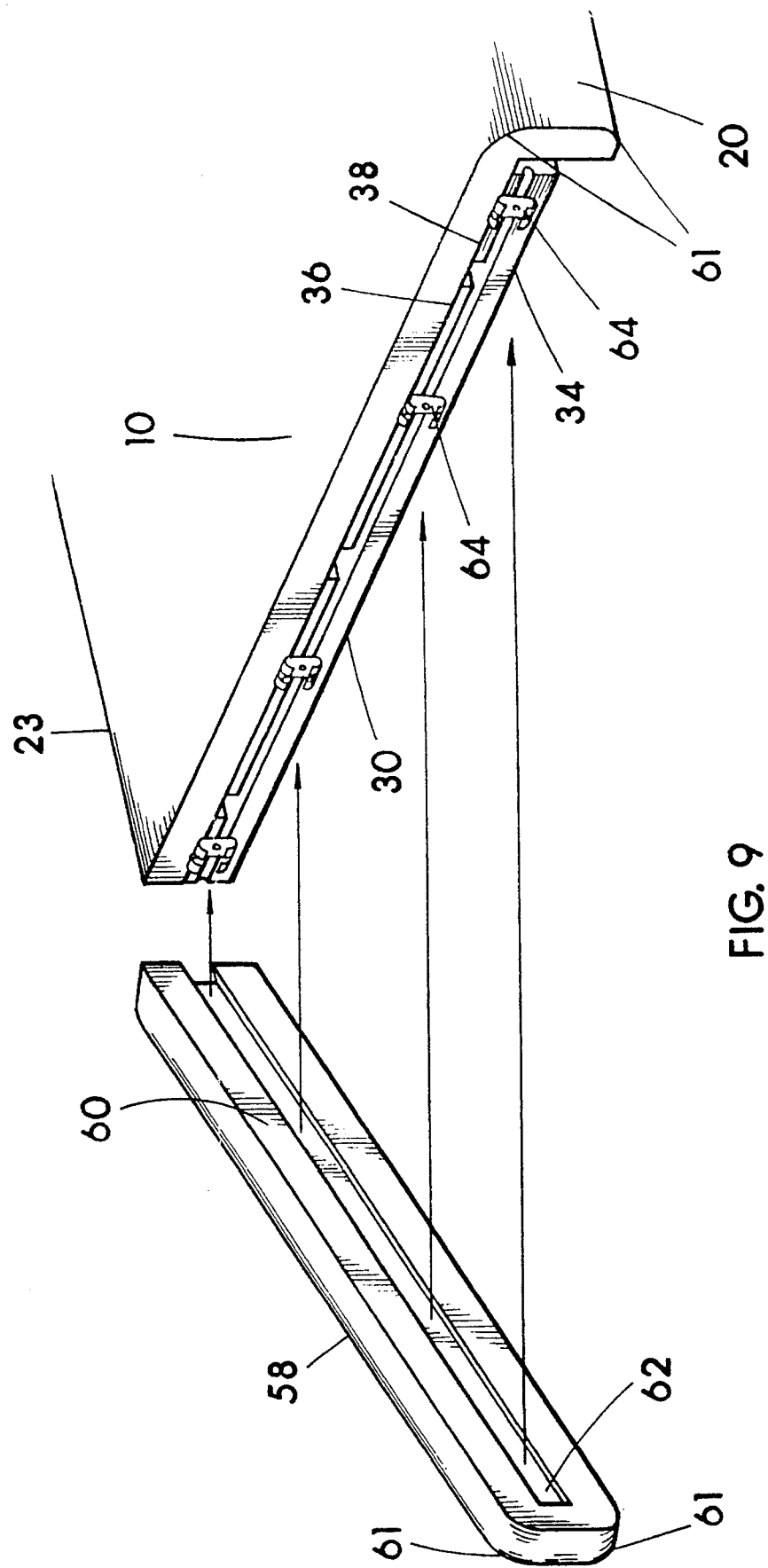
FIG. 9 is a perspective top front view of a terminal side edge of a countertop showing the attachment of a trim molding. The registration grooves normally present on the side edge of the countertop section and thickened front edge have been removed by a suitable cutting tool by the installer so as to leave a smooth flat surface against which the smooth back portion of the trim molding will abut. The multiple spring clips are shown affixed in a straight line to an inverted spring receiving strip affixed to the bottom surface of the countertop, and the spring clips are shown aligned for insertion into the centrally positioned dovetail shaped groove shown on the backside of the trim molding. The spring clips are shown positioned centered between the top surface of the countertop and the lower or bottom edge of the thickened front edge.

Since it is desirable to maintain a low number of parts to manufacture and stock, spring receiving strips 30 which are preferably made of a rigid wood material are structured to be useful in multiple applications, and specifically three applications in the example of the invention being described. Each receiving strip 30 is an elongated rigid member about 24 inches long, 2 ¼ inches wide and ¾ inch thick, although we do not wish to be restricted to these sizes given for example since the length of the strips 30 would be required to be less for cabinets which are shallower than 24 inches. Each receiving strip 30 includes multiple transverse grooves 40 spaced somewhat equidistance from one another so as to allow the use and placement of a spring 32 near back edge 23, another spring 32 somewhat in the center of the seam being glued, and another spring 32 somewhat adjacent thickened front edge 20 in order to having even drawing of one panel 10 toward the other panel 10 as will be better appreciated with continued reading. Three grooves 40 per strip 30 have been found to be adequate although more or less could possibly be used, and this allows for use of three springs 32 across each seam being adhered. Grooves 40 are cut into what is considered the bottom 38 of the strip 30 and extend a little over half way through the thickness. Grooves 40 serve the purpose of providing a space into which the body of springs 32 are placed lengthwise within the grooves and spanning across a seam while adhesive within the seam is curing. The recessing of the springs 32 into grooves 40 allows the rings 46 attached on the end of the springs 32 to be aligned for insertion into outside lateral groove 42. One lateral groove 42 is cut into one lengthwise side edge of each strip 30 and intersect transverse grooves 40 so that the body of the spring 32 may rest in groove 40 and the rings 46 may be hooked or caught in groove 42 with the spring 32 under tension. One ring 46 would be hooked into a groove 42 of a pair of strips 30 placed parallel and adjacent a seam and in spaced relationship to one another. Thus rings 46 are wider than groove 40 and dimensionally correct for fitting at least in part into groove 42 so that the rings 46 cannot slip or fall out. The grooves 42 preferably include a plurality of spaced pilot holes 44 for receiving screws 68 for attaching the spring clips 64 used with the trim molding 58 to be explained in detail later. On the oppositely disposed lateral side edge from groove 42, each strip 30 includes a lengthwise side edge groove 48 designated inside lateral groove 48. Grooves 48 shown in use in FIG. 6 face one another when two strips 30 are positioned one on either side of a custom seam 56 and the grooves 48 receive rigid metal biscuits or plates 50 to aid in aligning the top surfaces 26 which will be explained in detail later. Grooves 48 are not necessarily in open communication with transverse grooves 40, but rather, are positioned slightly above or more toward the bottom 36 of panels 10 when in use so that springs 32 may extend and pass beneath plates 50 as shown in FIG. 6. Each strip 30 includes transverse grooves 40 in intersecting open communication with outside grooves 42 which are positioned away from the seam during adhesive seaming whether in a factory prepared seam 28 or custom seam 56, and further each strip 30 includes a groove 48 positioned across the width of the strip from groove 42. Strips 30 are of rigid material, and wood or wood fiber board such as MDF (medium density fiberboard) has been found to be inexpensive and quite suitable from which to structure strips 30. Strips 30 are made in a factory setting. Depending upon the particular use of strip 30, it may be glued with its top surface 34 to bottom surface 36 of the countertop as shown in FIGS. 3, 4 and 6, or it may be glued with its bottom surface 38 glued to the bottom surface 36 of panel section 10 as shown in FIG. 9. Since in virtually all applications strips 30 are left in place permanently, a permanent and thus adhesive may be used to affix the strips in place on the bottom surface 36 of panels 10. Although any suitable fastening arrangement may be utilized to affix the strips 30, including hot melt glue, we have found that spray-on contact cement or glue functions well and is convenient to apply.

A description of the factory prepared seam 28 or seaming arrangement utilizing two panel sections 10 and registration grooves 24 will now ensue. As may be seen in FIG. 1, most of the seaming will be with the factory prepared seam 28 utilizing the A and B registration components of the side edges 22, as this will allow seaming of straight panel sections 12 to one another as well as to corner sections 14 and 16. It should be noted corner section 14 and 16 may also be joined to one another if desired. To define or complete a factory prepared seam 28, two proper panels 10 are selected for a particular location in the countertop to be defined. Strips 30 are then glued to the bottom surface 36 of panel sections 10, one strip 30 to each panel section 10 adjacent to the edges 22 to be adhered and in lengthwise parallel alignment with the edges 22, extending from adjacent back edge 23 toward front edge 20 where the strips 30 should terminate just short of the under rear side of front edge 20. The strips 30 are placed with the top surfaces 34 against the bottom surface 36 of the panels 10, and with the groove 42 outward away from the edge 22 or seam and the grooves 48 facing inward toward the edge 22 as may be ascertained from FIG. 3. Both strips 30 are affixed slightly away from the respective edge 22, for example ½ of an inch so as not to interfere with any slight step at the bottom of the panels 10 which may appear at the edges 22 as a result of the two panels 10 being of slightly different thickness. The grooves 24 of the edges 22 are cleaned as required, normally with a denatured alcohol. The panels,10 should be placed top surfaces 26 up, and placed on a flat support surface, which will normally be the actual cabinets on which the countertop is to finally cover. Next, the edges 22 are brought into close adjacency leaving about ⅛ between registration grooves 24. Aria component should be facing a B component of the registration grooves 24 and with the thickened front edges 20 adjacent one another. Preferably two strips of masking tape 54, one along each edge 22 should be applied on top surfaces 26 parallel and closely adjacent the edges 22 so that excess adhesive 52 will bead up on top of the masking tape 54, moving upward through the narrow gap between the tape 54. The masking tape 54 on which the adhesive beads simply renders it much easier to remove the excess adhesive, since most if not all of the bead of adhesive will come up when the masking tape is peeled away. Next a proper liquid adhesive 52, preferably color matched, and approved by the manufacturer for gluing or bonding to the plastic solid surfacing material is applied in liberal amounts into and along the full length of the crack between the edges 22 of the two adjacent panels 10. In order to prevent voids in the joint from insufficient adhesive, the joint is fully or nearly fully filled with adhesive. The two panels 10 are then pushed toward one another to close the gap and fully engage the registration grooves 24. Next the installer should align the front surfaces of thickened front edges 20 by pushing by hand or tapping with a rubber mallet. He should also check and verify the top surfaces 26 are aligned flush since any adjusting which might be necessary must occur prior to the adhesive curing. Next he should apply a strip of pressure sensitive tape lengthwise along the length of the seam and directly over the seam underneath the panels 10 as shown in FIGS. 3 and 4 so that the tape serves as a dam to prevent an excessive amount of the liquid glue from running out the bottom of the joint. A strip of tape should also be applied over the front seam between the adjacent thickened front edges 20 of the panels 10 to serve as a glue dam in this area. Next, the installer should install springs 32. Using the rings 46 as handles, the installer hooks a ring 46 into a groove 42 of a strip 30 with the body of the spring 32 aligned for placement into a groove 40. The installer then grasps the other ring 46 of the spring 32 and stretches the spring transversely across the joint and hooks that ring 46 into the groove 42 of the second or other strip 30 of the pair of strips 30. The center spring 32 should be applied first, followed by applying the outer springs 32 which are placed adjacent back edge 23 and front edge 20, although the order is not that critical. The alignment of the front surfaces at front edges 20 and the top surfaces 26 should again be checked. The springs 32 when connected will be stretched and under tension and continuously trying to draw the panels 10 toward one another. The edges 22 and registration groove 24 of the two panels 10 will be from one view point abutted with one another, although the viscous adhesive will be in effect holding the material of the panel sections 10 slightly apart. As the springs 32 pull the panels 10 toward one another, some of the liquid adhesive flows upward out of the joint and onto the tape 54 on top surfaces 26. The springs 32 continue to pull the panels 10 toward one another and to thus compensate for the glue moving out of the joint and to greatly reduce the possibility of voids. The panels 10, or at least one of the panels 10 must be left free of any securements so that the springs 32 may continue to close the joint and draw the panels 10 into closer adjacency as the adhesive flows. The adhesive will normally set or hardened within about 5 to 15 minutes. After the adhesive has hardened, the springs 32 may be removed as well as the dam tape and tape 54 on top surfaces 26. The excess glue is removed and the seam is sanded with increasingly finer abrasives such as sand paper and steel wool. The springs 32 may be used at the next seam to be adhered. The spring receiving strips 30 are left in place permanently, although they may be removed with a hammer and chisel if necessary, for example if they happen to fall over and interfere with a cabinet interior divider panel, which we have found is fairly rare.

A description of the panel section 12 shortening process utilizing what has been designated a custom seam 56 and a single panel section 12 absent use of registration grooves 24 will now ensue. As may be seen in FIG. 1, on occasion one of the available straight panel section 12 will not be of the proper length for a particular countertop layout. In FIG. 1, the straight panel section 12 shown with sink cut-out 70 has been shortened from a length which was too long for the supporting cabinets and the particular countertop desired. The next shorter panel section 12 available as a standard factory length would have been too short in this countertop layout, and thus the panel 12 has been shortened at 56. The panel 12 originally had registration grooves 24 at each lateral side edge 22, and was a single panel of a single thickness. Each end edge 22 is shown adhesively seamed to an adjacent panels section 10 utilizing the grooves 24, and specifically to a 90 degree corner section 14 on the left, and a 45 degree corner section 16 to the right. The shortening process involved the removal of a rectangular section of the panel 12 between the cut-out 70 and the corner section 16. The cut-out was made by taking out a rectangular section across the width of the panel 12 from back edge 23 through thickened front edge 20. The width of the removed section was equal to the amount which the panel 12 was excessively long. The cuts to take out the section were carefully placed to be made square or 90 degree to back edge 23, and with a cutting tool such as a router bit designed for cutting plastic solid surfacing material so that after removing of the rectangular section, the two pieces of the panel 12 could be pushed together and fit well, and after seaming would be a shorter panel 12 having the two lateral side edge 22 each having the registration grooves 24. In FIG. 6, custom seam 56 is shown in detail at a point in time after the rectangular section has been cut out and disposed of, and the two pieces of the panel 12 have been pushed back together. The cut to remove the rectangular section is made with a square cut so as to leave vertical edge faces used to define a butt joint as may be ascertained from FIG. 6. In FIG. 6, it can be seen that the custom seam 56 also uses a pair of spring receiving strips 30. In this seaming arrangement, a first strip 30 shown on the right is glued with the top surface 34 thereof to the bottom surface 36 of one of the pieces of panel 12 to be spliced to the other piece of panel 12. This first strip 30 is positioned lengthwise parallel to the panel edge to be adhered, but overhangs the edge a short distance, for example ½ or so. The overhanging edge of the strip 30 provides a shelf on which the bottom surface 36 of the second panel 12 portion will rest. Since the two portions of the panel 12 being spliced are of the same thickness, this resting of the second portion of panel 12 on the top of the overhanging portion of the first strip 30 will render the panel top surfaces flush. In order to clamp the joint while the adhesive cures and to assure maintained top surface flush alignment between the to panel 12 portions, a second strip 30 is adhered to the second panel 12 portion, shown to the left in the FIG. 6 drawing. This second strip 30 is affixed parallel to the lateral side edge for seaming, but in this case is kept back from the edge about the distance equal to the width of metal plate 50 minus the depth into which the plate 50 inserts into inside lateral groove 48 times two, since two oppositely disposed edges of the plate 50 insert into grooves 48, one groove 48 per each strip 30 of the pair of strips 30. In other words and for example, if plate 50 is 3 inches wide, and ½ inch of each side of the plate inserts in a groove 48, then the inside lengthwise edge of the second strip 30 is affixed away from the inside lengthwise edge of the first strip 30 about 2 inches. It should be noted however that the squared lateral side edges of the two portions of the panel 12 must abut one another in order to have a tightly closed and void free seam, and therefore the side edges of plate 50 must not bottom-out within grooves 48 prior to the panels edges abutting. Similar to the factory prepared seam 28, masking tape 54 should be applied to the top surface 26 of the panel portions to catch the bead of adhesive 52. Once the strips 30 are affixed in place, the plates 50 may be inserted into one of the grooves 48. Plates 50 are rigid plates of metal although could be any suitably rigid material, as the plates 50, and normally two or three short plates 50 are used in a single custom seam 56, serve as stabilizers prohibiting the second panel portion on the left from lifting from the top overhanging edge of the first strip 30, and thus the plates 50 must be sized to fit tightly into the grooves 48 to prevent angular movement of the plates 50 in the grooves 48. With the plates 50 inserted in the groove 48 of one of the strips 30, the other panel portion may then be moved into position wherein the plates 50 are partly started into the groove 48 of the respective strip 30 and the edge of the one panel portion is resting atop the overhanging lip of the one strip 30. It should be noted that the overhanging lip or portion of the strip 30 in this case is directly underneath the seam and will serve as a glue dam preventing an excess amount of the liquid adhesive from pouring out the bottom of the seam. At this point the two square cut lateral side edges of the two panel portions should be brought to within about ⅛ of an inch of one another, and a liberal amount of the proper adhesive placed into the narrow gap. The two panel portion are then pushed tightly together at which point the bead of glue is formed atop masking tape 54. The alignment of the front surface of the thickened front edges 20 should now be checked and rendered flush by pressing with the hands or a rubber mallet. Likewise the two adjacent top surfaces 26 should be inspected to verify they are in fact in a like plane. Next the springs 32 should be applied stretched across the joint and connected to the two strips 30 much like that of the factory prepared seam 28. All alignments should again be visually inspected while the adhesive is still liquid. After the adhesive has hardened, the springs 32 are removed, and strips 30 and plates 50 are normally left in place since they normally do not pose any problems with the finished countertop or cabinet operation or appearance. The tape 54 is removed and the seam finished with increasingly finer abrasives such as sand paper and steel wool. In FIG. 6 the thickened front edges 20 have not been drawn for the sake of clarity of that which is shown. It should be noted that just like in factory prepared seam 28, in custom seam 56, one of the panel portion must be left unsecured so the springs 32 may continue to close the joint while the adhesive is liquid and flowing upward from the joint.

Figure 7:
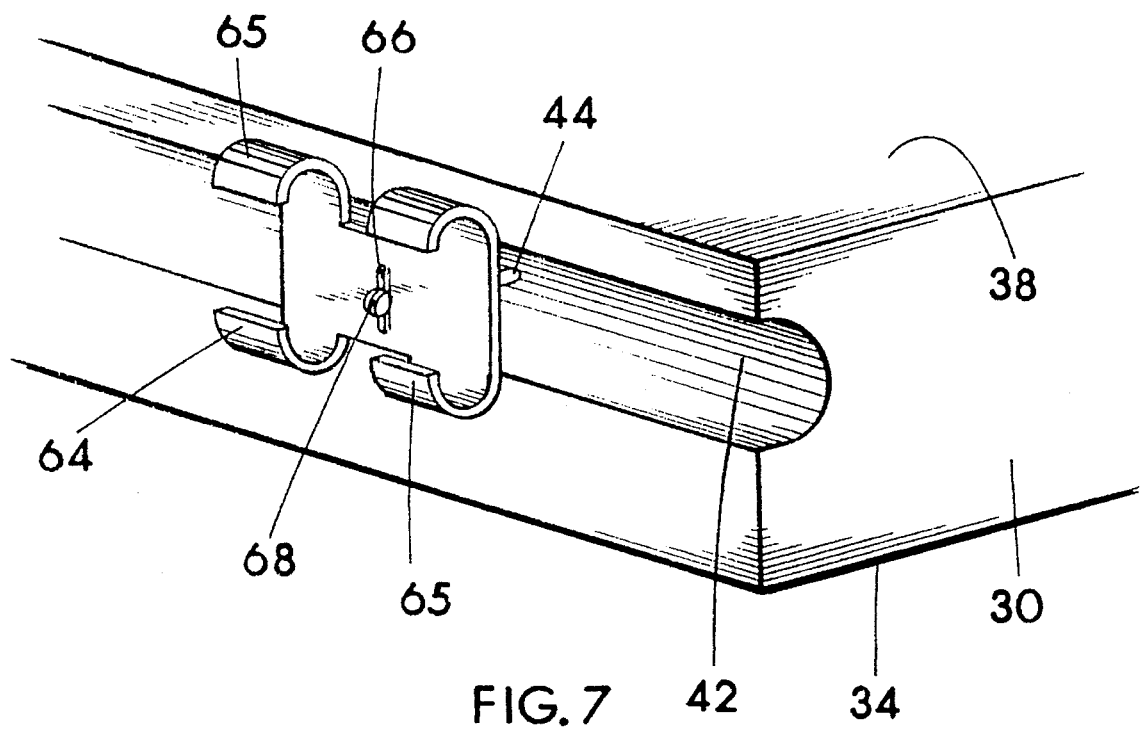
FIG. 7 is an enlarged partial perspective view of one corner of a spring receiving strip having one of the aforementioned spring clips affixed in place with a screw in the outside lateral edge groove which is shown off-center of the thickness of the spring receiving strip. When the spring clips are used, the spring receiving strip is inverted to have the bottom surface thereof adhered to the bottom surface of the countertop.
Figure 8:
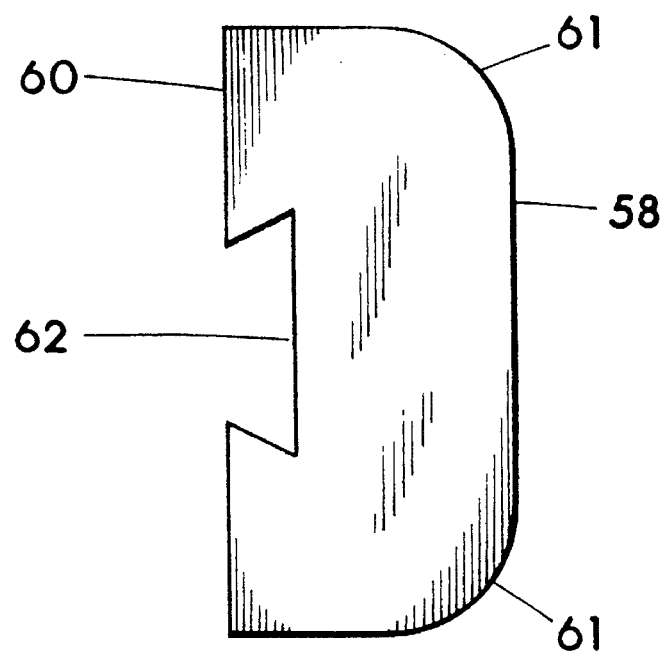
FIG. 8 is an enlarged back end view of the countertop end trim molding used for finishing off any exposed lateral terminal side edge of the countertop.

The detailed description given thus allows the defining of a countertop from the modular panel sections 10, and as previously mentioned, in many countertop layouts one or more terminal side edges of the countertop will terminate in an exposed area or manner such as is indicated in two locations in the FIG. I drawing. The lateral terminal side edges 22 left exposed include registration grooves 24 and do not include a thickened edge similar to thickened front edge 20, and thus appear as that shown in FIG. 5, an appearance which is not acceptable for the finished countertop. Therefore we have provided trim molding 58 shown best in FIGS. 1, 8 and 9, which is preferably invertible to allow it to be used as a right hand or left hand end of the countertop, and includes a dovetail shaped groove 62 cut into the back surface 60 cooperative with retaining spring clips 64 provided for finishing or trimming any exposed lateral side terminal edge of the countertop. The molding 58 is of rigid material, normally of matching material and color to the plastic solid surfacing material of the countertop panels. The dovetail shaped groove 62 is cut into the center back of the molding 58, and extended lengthwise with the molding, and opens through the rearward end of the molding as shown in FIGS. 8 and 9, but terminates prior to the terminal front end of the molding as may be seen in FIG. 9 The back surface 60 of the molding 58 surrounding the groove 62 is flat. The narrow opening of the groove 62 is adjacent the back surface 60, and the dovetail shaped groove 62 widens outward toward what is the finished exposed side of the molding. The finished front end of the molding 58 includes a radius 61 on the upper and lower lengthwise corners which continue into a front end radius which match the radius of the top and bottom forward radius 61 of thickened front edge 20 as may be ascertained from FIG. 9. In FIG. 9 it may be seen that if the molding is placed against the terminal side edge of the panel section 10, the radii 61 of the molding and front edge 20 would match. This match will occur if the molding were inverted and applied to a right hand end of a countertop also. In order to affix molding 58, the panel 12 which is selected to be slightly longer than needed for the finished countertop must have the registration grooves 24 cut off at the proper location so that when molding 58 is affixed in place, the finished countertop including the thickness of molding 58 is proper for the underneath supporting cabinets. The cutting off of the lateral side edge of the panel 12 so as to eliminate the grooves 24 includes making sure the cut is square, for at least most applications. The cut should be such as to render a flat vertical surface of the side edge of the panel 12, to allow a butt joint or mating between the flat back surface of the molding therewith. The cutting is from back edge 23 through thickened front edge 20. The proper length of molding 58 is such that when it is applied to the panel lateral side edge, the molding will extend from back edge 23 through front edge 20, and essentially align with and match the corner curves 61 of the front edge 20. A plurality of small spring clips 64 are used to clamp the molding against the edge of the panel 12 while adhesive between the two members cures. Spring clips 64 include multiple spring tabs 65 which are curved and sized to snap into the dovetail shaped groove 62 in the back center of molding 58. The shape and size of the spring clips 64, the tabs 65 and the dovetail shaped groove 62 is such that when the molding 58 is snapped over the clips 64, the tabs 65 will be against and pressing, being under continuous tension against the sloped walls within the dovetail shaped groove 62, and thus will be continuously drawing or at least attempting to draw the molding 58 toward the lateral side edge of the panel 12, even when the back surface of the molding is directly abutted against the edge of the panel 12. This spring clip drawing principle in combination with moldings for achieving a tightly closed joint is taught in U.S. Pat. No. 5,359,817 issued Nov. 1, 1994 entitled Architectural Moldings of Rigid Thermoset Polymer Based Material, And Method of Making And Attaching Same, which is assigned to the same assignee of the present invention, and therefore U.S. Pat. No. 5,359,817 is herein incorporated by reference as part of this disclosure. Spring clips 64 each include an aperture 66 in the main flat body portion thereof, the opening 66 preferably being a slotted opening allowing some adjustability in placement. The spring clips 64 are affixed in a straight horizontal row as shown in FIG. 9, with a clip 64 near both back edge 23 and front edge and one or more spring clips 64 between the outer clips. The affixment of the clips 64 is with a screw 68 shown in FIG. 7 into pilot hole 44 in groove 42 of a spring receiving strip 30. The strip 30 is adhered inverted with the top surface 38 thereof to the bottom surface 36 of the modular countertop panel. The strip 30 is placed lengthwise parallel to the edge, and flush with the edge of the countertop panel so as to not be too far rearward or outward to adversely effect the snapping in of the clips 64 into the groove 62 of the molding 58. Due to the groove 42 off center placement along the side edge of strip 30 relative to the thickness of the strip 30, and the thickness of the strip 30, front edge 20, molding 58 and placement of dovetail shaped groove 62, the lengthwise affixment of the spring clips 64 will place the center line horizontal axis of the row of clips 64 centered with the center height of front edge 20. Therefore when molding 58 is snapped onto clips 64, whether it is being placed on the left hand or right hand terminal edge of the countertop, the molding will be centered with thickened front edge 20 and the radii 61 of the front edge 20 and molding 58 front end adjacent the front edge 20 will match. The strip 30 when used on a left or right hand edge will need to be placed inverted as above described, and it will also need to be flipped end for end dependant upon the end of the countertop to which it is being applied. Prior to snapping the molding onto the affixed spring clips 64, a generous amount of the proper adhesive is applied to the entire countertop side edge surface including the side edge of the front edge 20. The adhesive is applied toward the top surface, and may also be applied to upper portion of the back edge 60 of the molding so that when that molding 58 is then snapped onto the clips 64, the joint area which will show in the finished countertop is completely filled with the color matched adhesive. Prior to the application of the adhesive, masking tape may also be applied to the edge of the countertop and adjacent edge of the molding to catch the bead of adhesive that will form upon snapping the molding into place. Damming tape may then be applied to the exterior top and front along front edge 20 to apply resistance to an excessive amount of the adhesive from moving upward and out of the joint before curing. In this application, damming tape on the bottom edge of the seam has not been found to be necessary, and would be difficult to effectively apply due to the clips 64 and groove 62. Similar to the tension springs 32 associated with the affixing of abutted edges of the countertop sections, the spring clips 64 associated with the edge trim molding 58 also apply predictable continuous clamping or drawing pressure while the adhesive hardens, continually closing the joint when the non-compressible liquid glue initially flows out of the joint, and working in conjunction with the groove 62 of the trim molding, to help insure a tightly closed and virtually imperceptible seam when finished. After the adhesive as hardened, the damming and masking tape may be removed, and the joint finished with progressively finer abrasives such as sandpaper and steel wool.

Although we have very specifically described the preferred structures, best modes and use of the invention, it should be understood that some changes in the detailed specifics may clearly be made without departing from the true scope of the invention in accordance with the appended claims.

What we claim is:

1. A modular countertop defined at least in part by a rigid first panel section adhesively bonded to a rigid second panel section, each of the panel sections having a substantially flat work space top surface and a bottom surface oppositely disposed from the top surface, each of the panel sections further having a back edge and a front edge across from said back edge, and at least two lateral side edges extending between the front edge and the back edge of each of the panel sections, one side edge of said first panel section positioned in close adjacency to one side edge of said second panel section with adhesive between the closely adjacent side edges, a pair of elongated material strips, one said material strip affixed to each of the panel sections in general parallel alignment with said closely adjacent side edges, each of the material strips including at least one groove retaining end-fittings of a plurality of elongated linear extendable and retractable tension springs extended and under tension spanning across said closely adjacent side edges; each of said tension springs having two oppositely disposed ends with each of the oppositely disposed ends affixed with one of said end-fittings, each of said end-fittings being larger in at least one dimension relative to a nominal diameter of the respective tension spring, and further wherein each of the end-fittings is sufficiently sized and shaped to be able to be readily grasped by fingers of a human hand and to thus serve as a handle.

2. A modular countertop according to claim 1 wherein both said first and second panel sections include front thickened edge members affixed to said front edges and extending downward below said bottom surfaces of the panel sections.

3. A modular countertop according to claim 2 wherein said first panel section and said second panel section are each comprised substantially of polymeric based solid surfacing material.

4. A modular countertop according to claim 3 wherein said modular countertop further includes an edge finish molding on a side edge of at least one said panel section; said edge finish molding having a dovetail shaped groove lengthwise in a back surface of the molding; a material strip attached to the bottom surface of said at least one said panel section adjacent said edge finish molding; a plurality of spring clips attached to an exposed side edge of the material strip attached to the bottom surface of said at least one said panel section; said spring clips snapped into said dovetail shaped groove of said edge finish molding.

\* \* \* \* \*